(12) United States Patent
Rowland et al.

(10) Patent No.: US 8,246,063 B1
(45) Date of Patent: Aug. 21, 2012

(54) RAPID DEPLOYMENT ASSEMBLY

(75) Inventors: Robert A. Rowland, Mt. Holly, NC (US); John Micheli, Dearborn, MI (US)

(73) Assignee: AOM Engineering Solutions, LLC, Livonia, MI (US)

( * ) Notice: Subject to any disclaimer, the term of this patent is extended or adjusted under 35 U.S.C. 154(b) by 517 days.

(21) Appl. No.: 12/462,827

(22) Filed: Aug. 10, 2009

(51) Int. Cl.
*B60R 3/02* (2006.01)

(52) U.S. Cl. ...................................... 280/166; 280/163

(58) Field of Classification Search .................. 280/166, 280/163, 762, 769, 785; 180/208; 296/61, 296/62; 182/85, 86, 91, 97, 127
See application file for complete search history.

(56) References Cited

U.S. PATENT DOCUMENTS

| | | | | |
|---|---|---|---|---|
| 560,752 A * | 5/1896 | Prator | ............................ | 182/156 |
| 597,706 A * | 1/1898 | Brown | ............................ | 182/95 |
| 887,167 A * | 5/1908 | Wilkes | ............................ | 49/37 |
| 1,792,586 A * | 2/1931 | Higgins | ............................ | 280/769 |
| 2,487,921 A * | 11/1949 | Culver | ............................ | 182/89 |
| 3,462,170 A * | 8/1969 | Smith et al. | ............................ | 280/166 |
| 3,865,399 A * | 2/1975 | Way | ............................ | 280/166 |
| 3,912,298 A * | 10/1975 | Humphrey | ............................ | 280/166 |
| 3,930,680 A | 1/1976 | Littlefield | | |
| 3,997,211 A * | 12/1976 | Graves | ............................ | 296/162 |
| 4,108,457 A * | 8/1978 | Garrett | ............................ | 280/166 |
| 4,108,458 A | 8/1978 | Owens | | |
| 4,180,143 A * | 12/1979 | Clugston | ............................ | 182/91 |
| 4,527,941 A * | 7/1985 | Archer | ............................ | 414/537 |
| 4,623,160 A * | 11/1986 | Trudell | ............................ | 280/166 |
| 4,720,116 A * | 1/1988 | Williams et al. | ............................ | 280/166 |
| 5,039,119 A * | 8/1991 | Baughman | ............................ | 280/166 |
| 5,150,762 A | 9/1992 | Stegeman | | |
| 5,205,603 A | 4/1993 | Burdette | | |
| 5,287,579 A * | 2/1994 | Estevez, Jr. | ............................ | 14/71.1 |
| 5,312,148 A * | 5/1994 | Morgan | ............................ | 296/61 |
| 5,401,056 A | 3/1995 | Eastman | | |
| 5,505,476 A * | 4/1996 | Maccabee | ............................ | 280/166 |
| 5,513,866 A | 5/1996 | Sisson | | |
| 5,533,771 A * | 7/1996 | Taylor et al. | ............................ | 296/26.1 |
| 5,547,040 A * | 8/1996 | Hanser et al. | ............................ | 182/88 |
| 5,549,312 A * | 8/1996 | Garvert | ............................ | 280/166 |
| 5,624,127 A * | 4/1997 | Arreola et al. | ............................ | 280/163 |
| 5,716,064 A | 2/1998 | Frerichs | | |
| 5,738,362 A | 4/1998 | Ludwick | | |
| 5,803,475 A * | 9/1998 | Dick | ............................ | 280/163 |
| 5,803,523 A * | 9/1998 | Clark et al. | ............................ | 296/26.1 |
| 5,876,051 A * | 3/1999 | Sage, Sr. | ............................ | 280/166 |
| 5,897,125 A | 4/1999 | Bundy | | |
| 5,941,342 A * | 8/1999 | Lee | ............................ | 182/95 |
| 5,944,332 A * | 8/1999 | Lee et al. | ............................ | 280/163 |

(Continued)

FOREIGN PATENT DOCUMENTS

WO WO 93/01987 4/1993

*Primary Examiner* — Katy M Ebner
*Assistant Examiner* — Brodie Follman
(74) *Attorney, Agent, or Firm* — John G. Chupa

(57) ABSTRACT

A rapid deployment assembly 10 which may be placed upon a selectively movable assembly 18, such as by way of example and without limitation, a pickup type truck, or other selectively movable assembly and which allows for rapid ingress and egress into and out of the assembly 18 and such ingress and egress is achieved by the selectively deployment of various members 12, 14, 16 which selectively form steps and which may later cooperatively form a tailgate assembly.

11 Claims, 5 Drawing Sheets

U.S. PATENT DOCUMENTS

| | | | |
|---|---|---|---|
| 5,957,237 A * | 9/1999 | Tigner | 182/127 |
| 6,199,894 B1 | 3/2001 | Anderson | |
| 6,213,486 B1 * | 4/2001 | Kunz et al. | 280/166 |
| 6,237,927 B1 | 5/2001 | Debo | |
| 6,241,312 B1 | 6/2001 | Watts et al. | |
| 6,474,668 B2 | 11/2002 | Debo | |
| 6,488,327 B1 | 12/2002 | Pearse et al. | |
| 6,659,224 B2 * | 12/2003 | Medsker | 182/91 |
| 6,942,271 B1 * | 9/2005 | Jamison et al. | 296/61 |
| 6,966,597 B2 * | 11/2005 | Tegtmeier | 296/62 |
| D537,399 S * | 2/2007 | Riddle | D12/203 |
| 7,252,168 B2 | 8/2007 | Lin | |
| 7,350,842 B2 | 4/2008 | Leblanc | |
| 7,441,809 B1 | 10/2008 | Coombs | |
| 7,677,584 B2 * | 3/2010 | Raley et al. | 280/166 |
| 7,735,894 B2 * | 6/2010 | King et al. | 296/62 |
| 7,766,357 B2 * | 8/2010 | Arvanites | 280/166 |
| 7,857,337 B2 * | 12/2010 | Ferguson et al. | 280/166 |
| 8,052,196 B1 | 11/2011 | Micheli | |
| 8,079,628 B2 | 12/2011 | Micheli | |
| 2001/0035625 A1 | 11/2001 | Debo | |
| 2002/0070577 A1 * | 6/2002 | Pool et al. | 296/62 |
| 2003/0070875 A1 * | 4/2003 | Medsker | 182/91 |
| 2004/0183326 A1 * | 9/2004 | Tegtmeier | 296/62 |
| 2005/0252720 A1 | 11/2005 | Chant | |
| 2006/0066121 A1 * | 3/2006 | Derosier | 296/62 |
| 2006/0272895 A1 * | 12/2006 | Lavoie | 182/127 |
| 2008/0143072 A1 * | 6/2008 | Parker | 280/166 |
| 2008/0157500 A1 * | 7/2008 | Raley et al. | 280/166 |
| 2009/0189365 A1 * | 7/2009 | Ferguson et al. | 280/166 |
| 2009/0243249 A1 * | 10/2009 | Arvanites | 280/166 |
| 2010/0122871 A1 * | 5/2010 | Gottlinger | 182/106 |
| 2010/0207415 A1 * | 8/2010 | King et al. | 296/62 |
| 2011/0140389 A1 * | 6/2011 | Ellement | 280/166 |

* cited by examiner

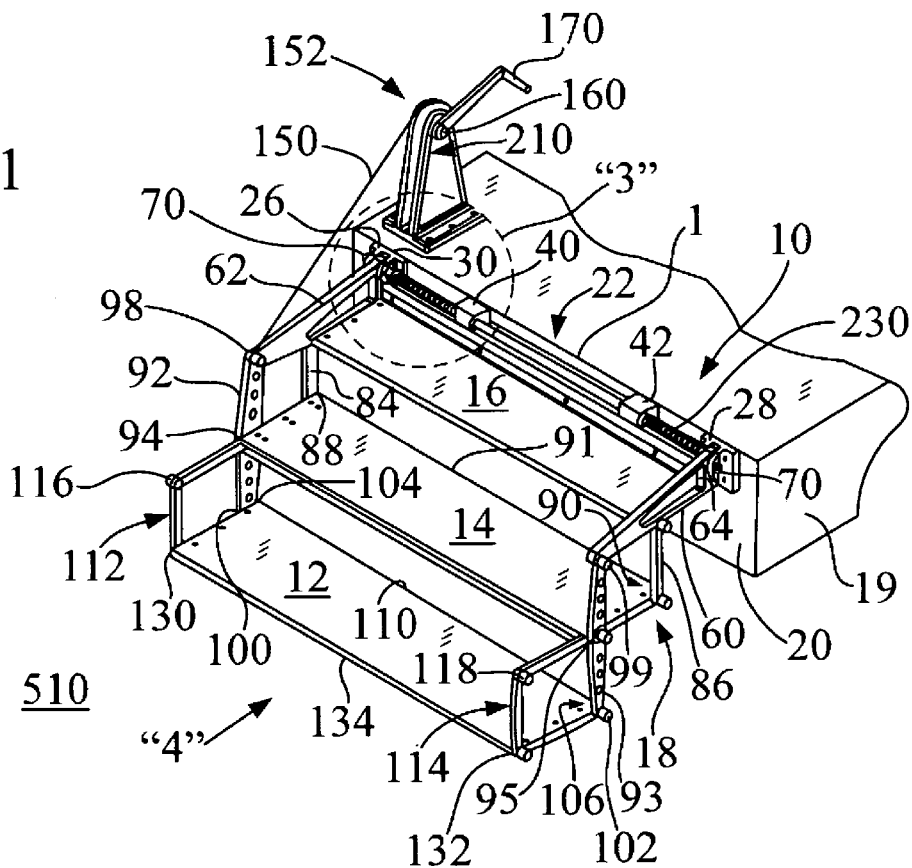
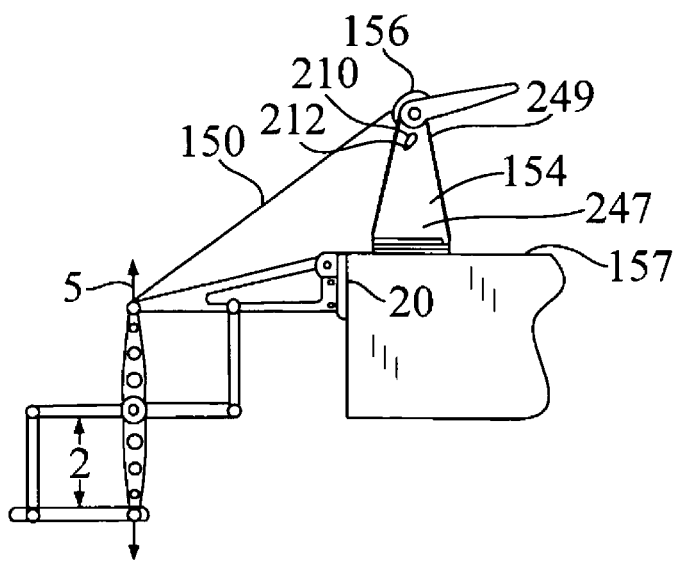

RAPID DEPLOYMENT ASSEMBLY

FIELD OF THE INVENTION

The present invention generally relates to a rapid deployment assembly and more particularly to an assembly which allows personnel to quickly and easily enter and exit from a selectively movable assembly, such as, by way of example and without limitation, a truck, a tank, and/or aircraft type assemblies, transportation assemblies/products such as trailers.

BACKGROUND OF THE INVENTION

Selectively movable assemblies, such as trucks (e.g., "pick-up" type trucks) are used to selectively transport people (e.g., soldiers) and often times material and/or other items (e.g., guns, ammunition, construction material) to various places. While these assemblies do indeed selectively transport these individuals and material and/or other items to various places, they do not easily allow for these individuals to quickly and easily enter and exit from these assemblies and do not allow the material and/or items to be easily and quickly placed into and removed from a selectively movable assembly.

By way of example and without limitation, it is necessary for these individuals to "jump off" or "jump onto" the back of a pickup type truck in order to effectuate egress and ingress from the truck (or other types of dissimilar assemblies). Such activity may undesirably cause physical injury to the individuals (e.g., soldiers and other types of individuals) and causes such activity to be inefficient and relatively slow. Such slowness is particularly undesirable on the battlefield where "every second counts" and slow movement may cause the individuals to be a vulnerable target of enemy fire. Slowly loading and unloading materials and/or other items from or onto a vehicle similarly causes these individuals to be a such target and delays the use and/or deployment of the items and materials.

There is therefore a need for a rapid deployment assembly which allows for efficient movement into and out of a selectively movable assembly, such as by way of example and without limitation the back of a pickup truck, or other type of dissimilar and selectively movable assembly, and which allows material and/or other items to be quickly and efficiently loaded onto and removed from such an assembly. The present inventions provide such an assembly and it should be noted that the present inventions are not limited for use on a particular type of assembly (such as a truck). Rather, the present inventions may be used on and/or integrally provided with a wide variety of selectively movable assemblies.

SUMMARY OF THE INVENTIONS

It is a first non-limiting object of the present inventions to provide a rapid deployment assembly which overcomes the drawbacks which are more fully delineated above.

It is a second non-limiting object of the present inventions to provide an assembly which may be selectively deployed upon a selectively movable assembly and which allows for efficient entry into and exit from the assembly.

It is a third non-limiting object of the present inventions to provide an assembly which may be selectively and movably deployed upon the back of a pickup type truck and which allows for efficient movement into and out of the truck and which may form a tailgate.

According to a first non-limiting aspect of the present inventions, a rapid deployment assembly is provided and includes a frame; a plurality of members which are movably deployed within the frame, wherein the plurality of members are selectively movable from a first deployed position in which the plurality of members cooperatively form a plurality of steps, to a second retracted position in which said plurality of members are stacked; a connection member which selectively connects the frame to a selectively movable vehicle; and a movement assembly which is coupled to the frame and which causes the plurality of members to be selectively moved from the first deployed position to the retracted position, wherein the movement assembly includes a base portion; a gear wheel which is movably deployed within the base portion; a pawl which is movably deployed within the base portion and in selective contact with the gear wheel; a cable which is coupled to the gear wheel and to the frame; a handle which is coupled to and which protrudes from the gear wheel, wherein the handle and the pawl cooperatively allow the gear wheel to selectively and substantially rotate only in a single certain direction which is effective to cause the plurality of members to selectively move from the first position to the second retracted position; and wherein the movement assembly further includes a lever which is coupled to the pawl and which is effective to selectively prevent contact between the pawl and the gear wheel, thereby allowing the plurality of members to be deployed in the first position.

According to a second non-limiting aspect of the present inventions, a rapid deployment assembly is provided and includes a frame comprising a first member, a second and a third member which are substantially identical and each having a triangular shaped cross sectional area, wherein the second and third members are deployed at opposed ends of the first member and project from the first member in parallel directions; a fourth and a fifth member which are substantially identical and which are respectively pivotally coupled to the second and third members; sixth and seventh members which are substantially identical and which are respectively and pivotally coupled to the second and third members; eighth and ninth members which are substantially identical, which are "L" shaped and which have respective center pivot joints and which are respectively coupled to the fourth and fifth members, wherein the rapid deployment assembly further including a plurality of members, wherein a first of the plurality of members is coupled to the first, second and third members and wherein a second of the plurality of members is coupled to the fourth, fifth, eighth and ninth members; a selectively movable vehicle connection assembly which is coupled to the frame and which connects the first member to a selectively movable vehicle; a movement assembly which is coupled to the second member and which is effective to cause the frame to be selectively folded, thereby causing the plurality of members to overlay one another and wherein the movement assembly is further effective to cause the frame to be placed in a deployed configuration in which the plurality of members cooperatively form at least two steps which project from the first member, thereby allowing for rapid movement into and out of a selectively movable vehicle.

According to a third non-limiting aspect of the present inventions, a rapid deployment assembly for use with a vehicle of the type which is selectively movable, the rapid deployment assembly includes a frame having opposed and substantially identical projections which are pivotally coupled to respective and substantially slots which are formed within the vehicle, wherein the frame is selectively movable from a first stored position within the vehicle to a second position away from the vehicle; a plurality of steps which are movably deployed within the frame; and a movement assembly which is fixedly positioned within the vehicle and which causes the plurality of steps to be selectively stacked and to overlay one another before the frame is placed in the first stored position, and which further causes the plurality of steps to cooperatively provide for ingress into the vehicle and egress from the vehicle after the frame is placed in the second position and wherein the movement assembly comprises a cable which is coupled to the frame; a ratchet assembly which is coupled to the cable; and a handle which is coupled to the ratchet assembly and which cooperates with the ratchet assembly to selectively move the frame into the first and second position and to move said plurality of steps into a stacked position.

These and other features, aspects, and advantages of the present inventions will become apparent from a reading of the detailed description of the preferred embodiment of the invention, including the subjoined claims, and by reference to the following drawings.

BRIEF DESCRIPTION OF THE DRAWINGS

FIG. 1 is a perspective view of the rapid deployment assembly which is made in accordance with the teachings of a preferred embodiment of the invention in an assembled relationship with a selectively movable assembly.

FIG. 2 is a side view of the rapid deployment assembly which is shown in FIG. 1.

DETAILED DESCRIPTION OF THE PREFERRED EMBODIMENT OF THE INVENTION

Figure 3:
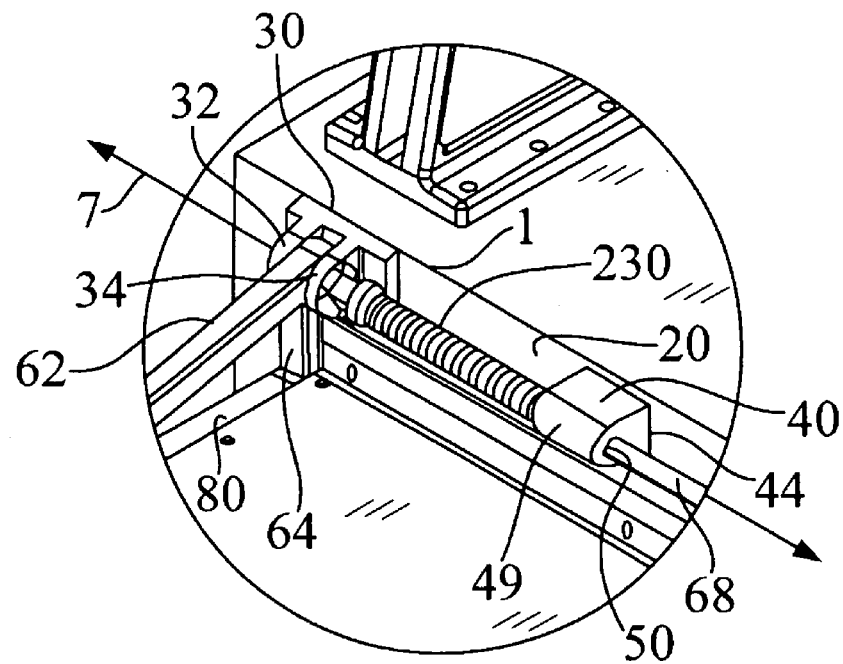
FIG. 3 is a partial exploded view of the portion of the rapid deployment assembly which is shown as portion "3" in FIG. 1.
Figure 4:
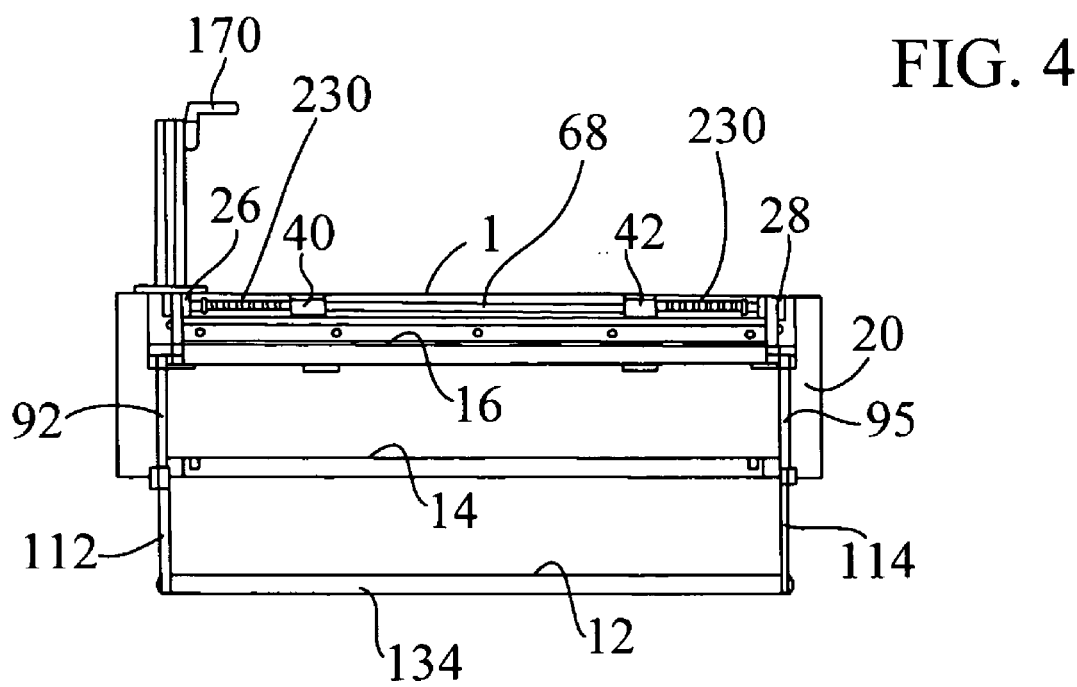
FIG. 4 is a view of the rapid deployment assembly which is shown in FIG. 1 and which is taken in the direction of view arrow "4".

Referring now to FIGS. 1-10, there is shown a rapid deployment assembly 10 which is made in accordance with the teachings of the various preferred embodiments of the inventions.

Particularly, the assembly 10 includes substantially identical, generally rectangular, and generally flat members 12, 14, 16 which are selectively and movably deployed within a frame assembly 18, and the frame assembly 18, as will be more fully discussed later, is adapted to be selectively and movably and removably deployed upon a selectively movable vehicle 19, such as, by way of example and without limitation, a pickup type truck, cart, trailer, aircraft type assembly, or any other assembly which is selectively movable. It should be realized that the assembly 10 may be deployed upon any desired type of selectively movable assembly or vehicle and nothing in this application is meant to limit the deployment of the assembly 10 upon only a pickup type truck. Further, any number of members 12, 14, 16 may be utilized and such members 12, 14, 16 may have dissimilar shapes and sizes and various members 12, 14, 16 can also be respectively made of multiple parallel sections or portions. Some or all of the assembly 10 (e.g., members 12, 14, 16) may be constructed of composite type material and/or graphite and/or Teflon®.

The frame assembly 18 is attached to the back surface 20 of the truck 19 (or other type of selectively movable assembly) by the securing portion 22 of the frame assembly 18. The securing portion 22 may be removably attached to surface 20 by conventional strategies. That is, the securing portion 22 includes a pair of substantially identical brackets 26, 28 which each have a respective flat back surface 30 which is coupled to and fixed onto the surface 20 by the use of rivets, pins, or some other conventional fastening strategy. Projecting from and integrally terminating into each flat surface 30 are a respective pair of substantially similar, opposed, linearly coextensive, and spaced apart and generally rounded or bulbous projections 32, 34. Further, the securing portion 22 includes a pair of substantially similar and spaced apart reception members 40, 42, each of which have a respective back flat surface 44 which is adhered or fastened to surface 20 by the use of rivets, pins, or some other conventional fastening strategy. Alternatively, each surface 44 is a "C-shape" or "hook shape" which is adapted to receive the edge 1 of the surface 20 and the hook shaped surfaces 44 may be welded or otherwise fastened to edge 1. Projecting from and integrally terminating from each surface 44 is a respective and generally rounded projection portion 49 which includes an axial through "type passageway" 50. Additionally, the assembly can be attached to existing hinging systems or to the current tailgate assembly (e.g., the surface 20, in this non-limiting example, is actually the surface of a tailgate).

Further, as shown, the frame assembly 18 includes substantially identical and spaced apart members 60, 62 which each have a substantially triangular shape (e.g., in one non-limiting embodiment each member 60, 62 respectively forms an isosceles triangle). It should be realized that each such member 60, 62 may each have dissimilar shapes or any other shape that optimizes mechanical loads or has some aesthetic appeal. In this non-limiting example, each member 60, 62, has a respective flat base portion 64. Each portion 64 is respectively deployed between unique pairs of projections 32, 34. Moreover, frame assembly 18 further includes a rod 68 which is received by and traverses the projections 40, 42 while traversing the respective passageways 50 and which further is received by and traverses the portions 26, 28. The rod 68 further is received by and traverses each member 60, 62 and respectively secures each member 60, 62 within a unique one of the projections 26, 28. Further, as shown, the rod 68 protrudes from each portion 32 and is secured at each opposed end, to a respective portion 32, by a respective nut 70 or some other conventional fastener strategy or technique. In proper assembly, the rod 68 has a linear axis of symmetry 7 which is parallel to the plane wholly containing the surface 20.

Further, each member 60, 62 includes a respective flat portion 80 upon which opposed ends of member 16 are attached by the use of rivets, pins, or some other conventional fastening strategy. In this manner, member 16 orthogonally projects from surface 20 when the assembly 10 is fully and outwardly deployed in the manner shown in FIG. 1 and which will be more fully described later. Further, the frame assembly 18 includes substantially identical and spaced apart members 84, 86 which are linearly co-extensive and which are parallel when the assembly 10 is fully and outwardly deployed in the manner shown in FIG. 1. Particularly, members 84, 86 are respectively coupled at one of their first respective ends to member 16 and at a second of their respective ends to respective and opposed corners 88, 90 of member 14. Corners 88, 90 lie along an axis of symmetry which is parallel to or comprises/includes edge 91. In this manner, members 84, 86 cooperatively and movably couple member 14 to member 16, couple member 14 to members 60, 62, and couple member 16 to members 60, 62.

Frame assembly 18 further includes opposed and substantially identical members 92, 93 and each member 92, 93 has a respective center portion 94, 95 and each member 92, 93 has a cross sectional area which is tapered in an opposed direction away from the respective center portion 94, 95, along a respective longitudinal axis of symmetry 5. The respective rate of taper in each direction may or may not be equal. Respective first ends 98, 99 of members 92, 93 are respectively coupled to members 62, 60 and respective second ends 100, 102 of members 92, 93 are respectively coupled to opposed corners 104, 106 of the member 12. Corners 104, 106 lie along an axis which is parallel to and/or which comprises edge 110.

Frame assembly 18 further includes a pair of substantially identical and generally L-shaped members 112, 114 which are respectively and selectively articulatable about their respective center portions 116, 118 and which have a respective first end which is respectively coupled to center portions 94, 95 and a respective second end which is respectively coupled to opposed corners 130, 132 of member 12. Corners 130, 132 lie along an axis which is parallel to and/or which comprises edge 134. In this manner, the member 12, when the assembly 10 is outwardly deployed in the manner shown in FIG. 1, is parallel to the members 14, 16. In one non-limiting embodiment, the height 2 between each adjacent pair of members 12, 14, 16 is substantially similar and is about 2 inches to about 48 inches when assembly 10 is fully and outwardly deployed, as shown in FIG. 1, and each of the members 12, 14, 16 are parallel to each other.

The rapid deployment assembly 10 further includes a cord or flexible connecting member 150 (e.g., a commercially available cable commonly referred to as a "⅜ inch cable") which is connected to end 98 of member 92. The assembly 10 further includes a winch or crank assembly 152 and the assembly 152 may be of the "manual crank" type or of the automated type. The assembly 152 is coupled to cable 150. The assembly 152 includes a body 154 which is fixed or stationarilly deployed upon the surface 157 of the selectively movable assembly 19 and such fixation may be achieved by the use of bolts or some other conventional fastening strategy. The assembly 152 includes a drum or gear wheel 156 which is rotatably deployed within the body 154 (e.g., the generally round drum or gear wheel 156 is fixed within the body 154 by a "through type" pin or member 160 and the pin or member 160 lies along an axis 163 about which the drum 156 may selectively rotate). Particularly, the pin or member 160 selectively rotates within the body 154 and such rotation is transferred to the drum or gear wheel 156. In one non-limiting embodiment, pin 160 is movably received by opposite surfaces 247, 249, of body 154 (e.g., opposed ends of pin 160 are respectively attached to surfaces 247, 249). The drum 156 also receives the cable 150. Further, assembly 152 includes a handle 170 which is coupled to and which projects from the member 160 and movement of the handle 170 causes the member 160 and the drum 156 to selectively rotate in a selected clockwise or counterclockwise direction.

Figure 6:
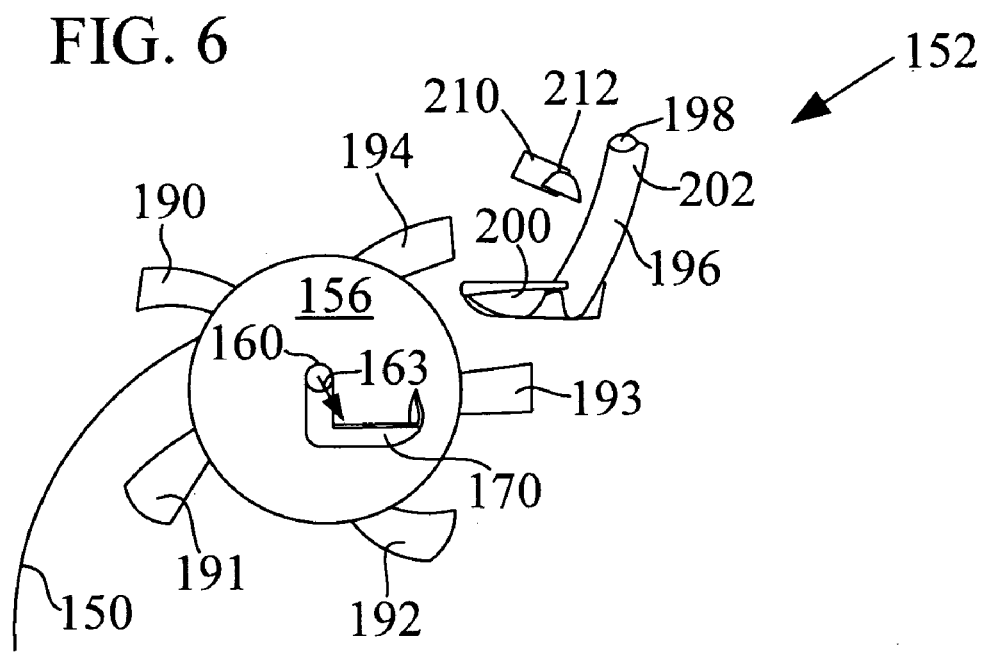
FIG. 6 is an exploded partial view of the ratchet portion of the rapid deployment assembly which is shown in FIG. 1.

In the most preferred, although non-limiting embodiment of the invention, projecting from the drum 156 and integrally formed with the drum 156 are a plurality of substantially identical projections, gears or flanges, such as gears or flanges 190, 191, 192, 193, and 194. Further, disposed within the assembly 152 (within the body 154) is a pawl or boot shaped member 196 which pivots about the pin 198 and the pin 198 movably secures the member 196 within the body 154. The pin 198 may be coupled, at opposed ends, to surfaces 247, 249. The "foot shaped" end 200 of the member 196 is deployed between two adjacent projections 193, 194 while the "leg shaped" end 202 is actually coupled to the pin 198. Further, a slot 210 is formed within the body 154 (e.g., on one of the surfaces 247, 249) and a lever 212 is movably fixed within the body 154 by the use of a pin or some other conventional fastener strategy and, at one end, may be attached to one of the surfaces 247, 249. Alternatively, the lever 212 just frictionally and movably resides within the formed slot 210. The lever 212 is constrained to selectively move within the slot from a first selected position which is shown in FIG. 6 and in which the lever 212 is remote from the leg portion 202, to a second selected position in which the lever 212 selectively contacts the leg portion 202 and causes the foot portion 200 to move away from contact with any of the projections 190-194 and away from a position between any adjacent pairs of projections 190-194.

In operation, when the assembly 10 is fully and outwardly deployed, as is perhaps shown best in FIG. 1, individuals may quickly and easily enter and exit from the selectively movable assembly 19 by using the positioned parallel and outwardly deployed members 12, 14, 16 as steps. The positioned members 12, 14, 16 therefore allow quick ingress and egress in and from the selectively movable assembly 19. These individuals may carry material and/or out other items into and/or out of the selectively movable assembly 19.

When such selective ingress and egress are no longer desired, the lever 212 is moved to a position which is remote from the member 196 and the handle 170 is selectively turned in a clockwise direction. The projections 190-194 cooperate with the member 196 to ensure that even if the handle 170 is released, the drum 156 cannot appreciably turn in the counterclockwise direction because boot portion 200 prevents a projection 190-194 from passing by it in a counterclockwise direction. Thus, as the handle 170 is selectively rotated in a clockwise direction, (either manually or by the use of a motor in an automated operation), the cable 150 is wound around drum 156 and upward pressure (e.g., away from surface 510) is exerted onto the corner 98. Such continued pressure causes the members 60, 62, 92, 93 and 112, 114 to have upward pressure and to articulably cooperate to have member 14 overlay member 12 (e.g., member 12 is moved by members 112, 114 under member 14) and to have the member 14 (with member 12 underneath of the member 14) be placed under member 16. Thus, member 16 overlays member 14 and member 14 overlays member 12. The selectively folded or stacked members 16, 14, and 12 are then, with continual turning of the handle 170, placed in a perpendicular position with respect to surface 30 (see, for example, FIG. 5) and may even cooperatively form a tailgate assembly. Importantly, since only limited counterclockwise movement is allowed, should the handle 170 be released, the assembly 10 will generally retain the protracted position the assembly 10 had just prior to the release of the handle 170.

Figure 5:
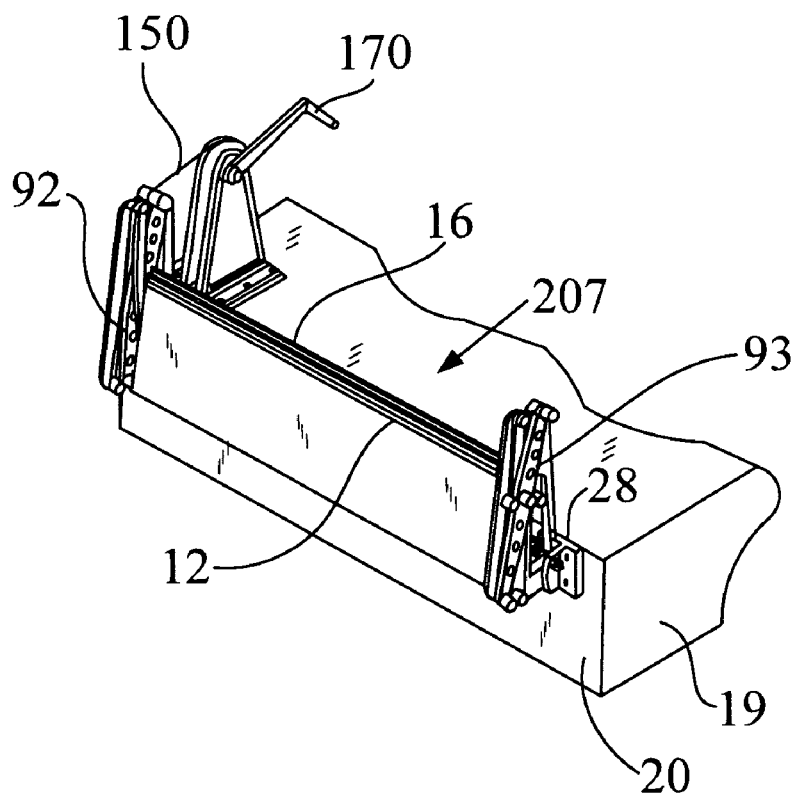
FIG. 5 is a view of the rapid deployment assembly which is shown in FIG. 1 but which is shown in a selective closed position and which is taken in the direction of view arrow "4".

When it is desired to fully deploy the assembly 10 from the position shown perhaps best in FIG. 5 to the position best shown in FIG. 1, the lever 212 is moved to engage the member 196 thereby allowing the drum 156 to freely rotate in a counterclockwise manner. Such free rotation allows the members 12, 14, 16 to freely and cooperatively assume the various respective positions shown in FIGS. 1, 2, and 4 (e.g., in this non-limiting embodiment, there is no force which maintains their folded position and the force of gravity or a slight push on the selectively folded members 12, 14, 16 in a direction 207 away from the assembly 19 causes the members 12, 14, 16 to cooperatively form the positions shown in FIG. 1).

In a non-limiting embodiment of the invention, one or more torsional springs, such as spring 230 is deployed upon and receives the member 68 and provides upward biasing force which assists a user of the assembly 10 to move the assembly 10 to a selectively closed position, as is best shown in FIG. 5 and in order to deploy the assembly 10 in the manner shown in FIG. 1, the biasing force may need to be overcome by a harder push in direction 207 and a movement of lever 212 to engage member 196.

In another non-limiting embodiment, two assemblies 152 are deployed and are each respectively coupled to members 92, 93. The use of two assemblies 152 ensures that, even in the event of a failure of one of the provided assemblies 152, the rapid deployment assemblies 10 may still be easily and selectively placed in a stored or an outwardly deployed position.

Figure 8:
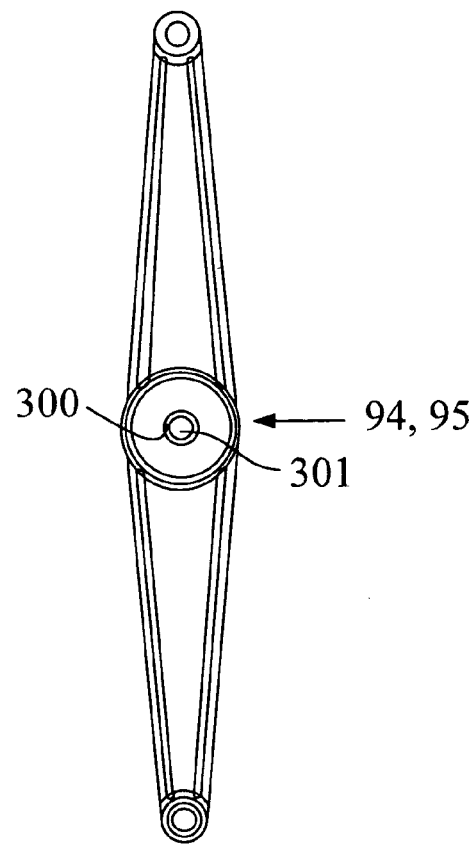
FIG. 8 is a front view of a portion of the rapid deployment assembly shown in FIGS. 1 and 2.
Figure 9:
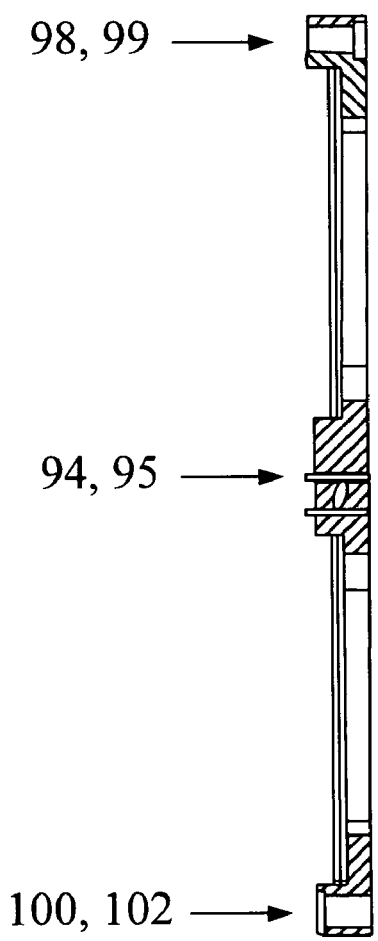
FIG. 9 is a side view of the portion shown in FIG. 8.
Figure 10:
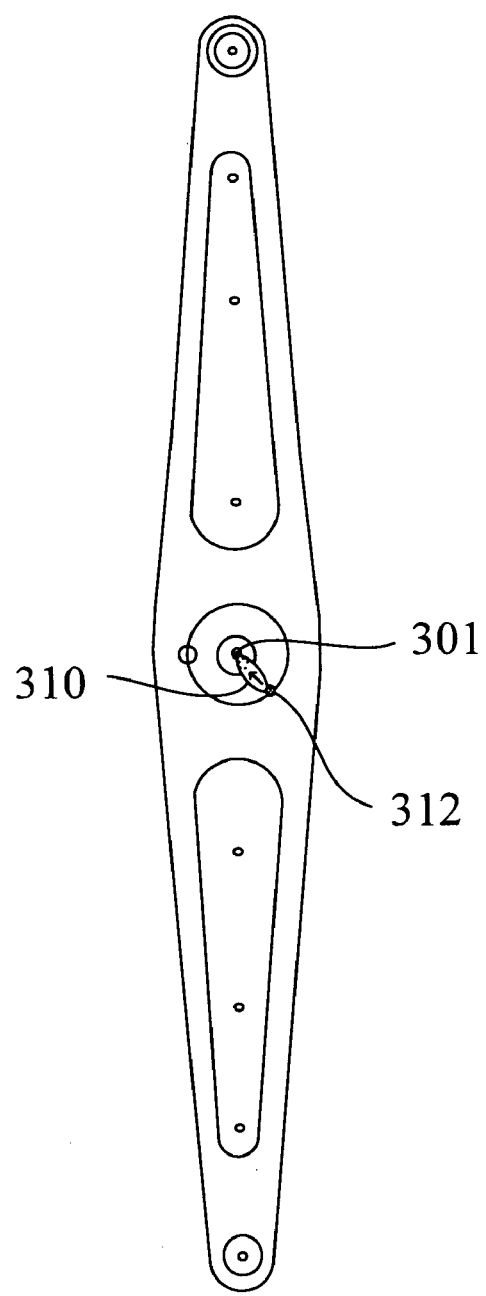
FIG. 10 is a back view of the portion shown in FIG. 8.

Further, in yet another non-limiting embodiment, as is perhaps best shown in FIGS. 8, 9, 10, each center portion 94, 95 includes a first central "through hole" or opening 300 which respectively receives a pin 301. Respective pins 301 of portions 94, 95 are respectively coupled to opposed edges of step 14 and respectively allow the member 93 to respectively rotate and allow the assembly 10 to be selectively moved in the manner previously described. Further, in this non-limiting embodiment, each center portion further includes a slot 310 and a pin 312 which movably and frictionally resides within the slot 310 and which is movable from a first position remote from the pin 301 to a second position in contact with the pin 301. In another non-limiting embodiment, each pin 312 respectively and movably resides within respectively opposed edges of step 14. In this manner, when the assembly 10 is outwardly deployed and the pins 312 are made to respectively contact unique pins 301, the steps 12, 14, 16 are caused to remain parallel to each other and are "locked" into position (e.g., such respective contact prevents respective rotation of members 92, 93). The pins 312 are forcibly moved away from the pins 301 when the assembly 10 is retracted by the assemblies 152.

Figure 7:
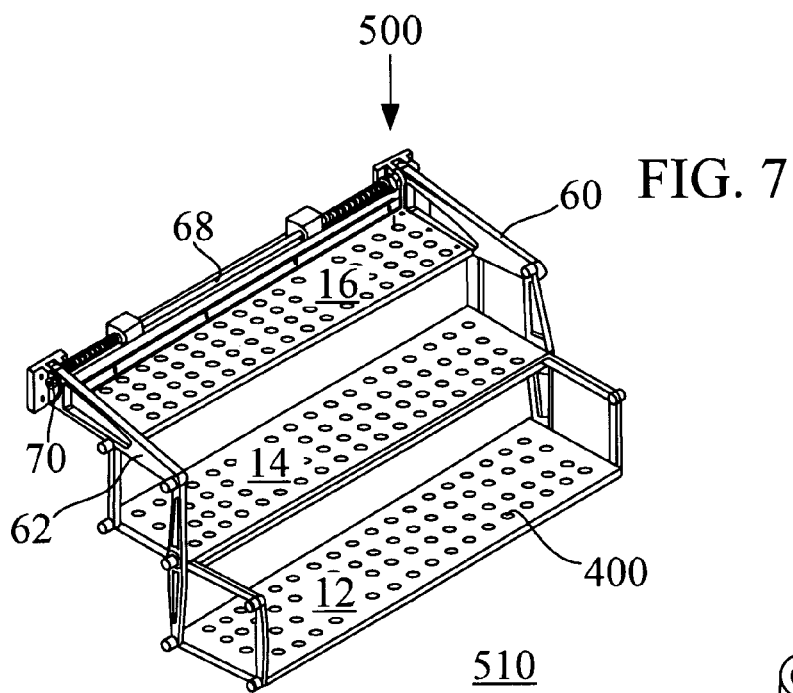
FIG. 7 is a perspective view of a rapid deployment assembly which is made in accordance with the teachings of another preferred embodiment of the invention.

Further, as shown best in the alternate embodiment depicted within FIG. 7, each step 12, 14, 16 may have a plurality of holes 400 and these holes 400 reduce the wind drag and weight associated with the above-described movement of the steps 12, 14, 16; improves overall fuel economy of assembly 19; and reduces the likelihood of debris "build up" on the steps 12, 14, 16.

In this alternate embodiment, shown as assembly 500, assemblies 152 are obviated and the assembly, which is substantially similar to assembly 10 (except for the holes 400 in step 12, 14, and/or 16 and the obviation of assemblies 152), is selectively retracted by pulling up (away from ground 510) on portions 60, 62 which causes the one or more springs 230 to cause the assembly 10 to be placed in a selectively stored position. In this embodiment, to outwardly deploy the assembly 10, the members 12, 14, 16 are pulled in the direction of ground 510 until pins 312 contact pins 301 which stabilizes the outwardly deployed assembly 10.

Further, assemblies 152 can be replaced by a conventional wench assembly, bicycle chain assembly, or simply a cord which may be selectively pulled and released/lowered.

It is to be understood that the inventions are not limited to the exact construction or methodology which has been illustrated above, but that various modifications may be made without departing from the spirit and the scope of the inventions as is delineated in the following claims.

What is claimed is:

1. A rapid deployment assembly comprising a frame assembly having opposed first and second substantially identical brackets, each of said substantially identical brackets having a respective flat back surface and a respective front surface having a respective pair of spaced apart rounded projections wherein, said flat back surfaces are coplanar, said rapid deployment assembly further having a first reception member having a flat back surface, and wherein said first reception member is disposed between said first and second substantially identical brackets and has a first axial through hole; a second reception member having a flat back surface and wherein said second reception member is disposed between said first reception member and said second substantially identical bracket and has a second axial through hole which is aligned with said first axial through hole, wherein said frame assembly further comprising a first triangularly shaped member which is disposed between said pair of spaced apart end rounded projections of said first substantially identical bracket, and a second triangular shaped member which is disposed between said pair of spaced apart and rounded projections of said second substantially identical bracket; and a rod which traverses said first and second triangularly shaped members, said pair of spaced apart rounded projections of said first bracket, said pair of spaced apart rounded projections of said second bracket, and said first and second reception members, thereby allowing said first and second triangularly shaped members to selectively rotate about said rod, and wherein said frame assembly further comprises an upwardly biasing torsional spring which receives said rod, and wherein said rapid deployment assembly further comprises a step assembly which is coupled between said first and second triangularly shaped members and which is selectively movable from a fully extended position away from said rod to a fully retracted position in which said step assembly collapses and is selectively rotated about said rod in a clockwise direction with the aid of said torsional spring such that said collapsed steps lie in a plane which is parallel to both of said flat back surfaces of said first and second substantially identical brackets.

2. The rapid deployment assembly of claim 1 further comprising a winch assembly; and a cord which is coupled to said winch assembly and to said first triangular shaped member and wherein said winch assembly selectively moves said step assembly from said first extended positions to said second retracted position.

3. The rapid deployment assembly of claim 2 wherein said step assembly comprises a plurality of steps and wherein respective first and second opposed ends of each of said steps are coupled to at least one member.

4. The rapid deployment assembly of claim 3 wherein said winch assembly includes a selectively movable drum assembly, and a pawl which selectively engages said drum assembly and which allows the drum assembly to appreciably move in only direction.

5. The rapid deployment assembly of claim 4 wherein each of said plurality of steps includes a respective plurality of holes.

6. The rapid deployment assembly of claim 5 wherein said winch assembly further includes a member which selectively prevents said pawl from contacting said drum assembly.

7. A rapid deployment assembly comprising first and second mounting plates, each of said first and second mounting plates having respective flat back surfaces and respective front surfaces, wherein each of said respective front surfaces including a pair of spaced apart projections having respectively communicating through holes; a rod which traverses each of said respective pair of spaced apart projections of said respective front surfaces of said mounting plates and wherein said rod movably and rotatably resides within said respective pair of projections of said first and second mounting plates; a first triangular member which resides between said pair of spaced apart projections of said first mounting plate and through which said rod passes; a second triangular member which resides between said pair of spaced apart projections of said second plate and through which said rod passes; a first step having a pair of opposed narrow ends which are respectively coupled to said first and second triangular members; a second step; a first corner member which couples a first corner of said second step to said first triangular member; a second corner member which couples a second and opposed corner of said second step to said second triangular member; a first tapered member having a first end coupled to an end of said first triangular member and also having a second end; a second tapered member having a first end coupled to an end of said second triangular member and also having a second end; a third step having first opposed ends respectively coupled to said second end of said first tapered member and to said second end of said second tapered member; a first L shaped member having a center and which is selectively articulable about said center, and which further includes a first end which is coupled to the center of said first tapered member, and which includes a second end; a second L shaped member having a center and which is selectively articulable about said center, and which further includes a first end which is coupled to the center of the second tapered member, and wherein further includes a second end; and a third step which is coupled to said second end of said first L-shaped member, to said second end of said second L-shaped member, to said second end of said first tapered member and to said second end of said second tapered member and wherein said first and second triangular members cooperate with said first and second tapered members and said first and second L-shaped members cooperatively and selectively allow said first, second, and third steps to be moved from a first extended position to a second collapsed position in which said first, second and third steps are collapsed and rotated in a clockwise direction about said rod.

8. The rapid deployment assembly of claim 7 further comprising a winch assembly; and a cord which is coupled to said winch assembly and to said first triangular shaped member and wherein said winch assembly selectively moves said step assembly from said first extended positions to said second retracted position.

9. The rapid deployment assembly of claim 8 wherein said winch assembly includes a selectively movable drum assembly, and a pawl which selectively engages said drum assembly and which allows the drum assembly to appreciably move in only direction.

10. The rapid deployment assembly of claim 9 wherein each of said plurality of steps includes a respective plurality of holes.

11. The rapid deployment assembly of claim 10 wherein said winch assembly further includes a member which selectively prevents said drum.

* * * * *